(12) United States Patent
Maynard

(10) Patent No.: US 8,763,272 B2
(45) Date of Patent: *Jul. 1, 2014

(54) SOLVENT RECOVERY

(75) Inventor: Nigel Paul Maynard, Waitakere (NZ)

(73) Assignee: Osmose, Inc., Buffalo, NY (US)

( * ) Notice: Subject to any disclaimer, the term of this patent is extended or adjusted under 35 U.S.C. 154(b) by 169 days.

This patent is subject to a terminal disclaimer.

(21) Appl. No.: 13/266,687

(22) PCT Filed: Apr. 27, 2010

(86) PCT No.: PCT/NZ2010/000080
§ 371 (c)(1),
(2), (4) Date: Oct. 27, 2011

(87) PCT Pub. No.: WO2010/126381
PCT Pub. Date: Nov. 4, 2010

(65) Prior Publication Data
US 2012/0042535 A1 Feb. 23, 2012

(30) Foreign Application Priority Data
Apr. 27, 2009 (NZ) ........................................ 576577

(51) Int. Cl.
*F26B 3/00* (2006.01)
*B27K 5/00* (2006.01)
*B27K 3/02* (2006.01)
*F26B 5/04* (2006.01)
*F26B 3/347* (2006.01)
*F26B 25/00* (2006.01)

(52) U.S. Cl.
CPC ............ *B27K 3/0292* (2013.01); *B27K 5/0055* (2013.01); *F26B 2210/16* (2013.01); *F26B 25/006* (2013.01); *F26B 5/048* (2013.01); *F26B 3/347* (2013.01)
USPC ................................. 34/337; 34/338; 34/339

(58) Field of Classification Search
USPC ........................................... 34/337, 338, 339
See application file for complete search history.

(56) References Cited

U.S. PATENT DOCUMENTS

| 5,075,131 | A | 12/1991 | Hattori et al. |
| 5,593,483 | A * | 1/1997 | Brunken ........................ 106/2 |
| 6,274,199 | B1 | 8/2001 | Preston et al. |
| 6,645,257 | B1 | 11/2003 | Schacht et al. |
| 6,649,205 | B2 | 11/2003 | Nicola |
| 6,841,570 | B2 | 1/2005 | Haenke |
| 7,008,997 | B2 | 3/2006 | Kovacs |
| 2002/0197367 | A1 | 12/2002 | Nicola |
| 2007/0020189 | A1 * | 1/2007 | Maynard ........................ 424/40 |
| 2008/0221067 | A1 | 9/2008 | Hoffman |

FOREIGN PATENT DOCUMENTS

| EP | 1300184 | 4/2003 |
| GB | 2360470 | 9/2001 |
| JP | 02-081603 | 3/1990 |
| JP | 2007-231196 A | 9/2007 |
| NZ | 272245 A | 1/1997 |
| WO | WO2006-041319 | 4/2006 |

OTHER PUBLICATIONS

Microwave assisted organic synthesis—a review, Lidstrom, Pelle et al., Tetrahedron 57 (2001) 9225-9283.*
CRC Handbook of Basic Tables for Chemical Analysis, 2nd edition, 2003.*
International Search Report, PCT/NZ2010/000080, Jun. 29, 2010.
Mandal et al., 2007, Microwave Assisted Extraction—An Innovative and Promising Extraction Tool for Medicinal Plant Research. Pharmacognosy Reviews vol. 1, Issue 1, Jan.-May, 2007.
Molins et al., 1996. Microwave Assisted Solvent Extraction (MASE) for the Efficient Determination of Triazines in Soil Samples with Aged Residues. Chromatographia vol. 43, Nos. 9-10 / Nov. 1996, pp. 527-532.
Camel 2000. Microwave-assisted solvent extraction of Environmental Samples TrAC Trends in Analytical Chemistry vol. 19, Issue 4, Apr. 2000, pp. 229-248.
PNEAC Article—"Best Management Practices & Pollution Prevention"; "Reusable Shop Towels"; and "Disposable Wipes"; on p. 1 of 2.
PNEAC Article—Case Study on "Keller Crescent Company's Solvent Recovery Solution"; by Gary Jones; pp. 1-4.
Extented European Search Report—EP 10 77 0001—Feb. 11, 2014.

* cited by examiner

*Primary Examiner* — Kenneth Rinehart
*Assistant Examiner* — Gajanan M Prabhu
(74) *Attorney, Agent, or Firm* — Covington & Burling LLP

(57) ABSTRACT

The invention relates to compositions for, and methods of, delivering treatment compounds to lignocellulosic substrates, wherein the solvent is recovered using RF energy.

19 Claims, No Drawings

SOLVENT RECOVERY

FIELD

This invention relates to compositions for use in treating organic substrates and to methods of delivering compositions to organic substrates. In particular, the invention relates to compositions for, and methods of, delivering treatment compounds to lignocellulosic substrates, such as lumber, or other degradable organic substrates, wherein the solvent is recovered from the substrate. In a particularly preferred embodiment, although not exclusively, the invention relates to compositions for, and methods of, delivering treatment compounds to lignocellulosic substrates, wherein the solvent is recovered using RF energy.

BACKGROUND

Lumber from many tree species lacks durability and frequently has inferior physical properties. These deficiencies are more likely to occur in lumber extracted from man-made plantation forests. Since durability and enhanced physical properties can be required it is typical for lumber processors to alter lumber properties.

It is well known to those versed in the art that these deficiencies can be remedied to a greater or lesser extent by impregnation of the lumber with preservatives, polymers and the like. Such impregnation processes have been used for many decades and most frequently involves impregnation with treating fluids.

A relatively modern trend is to treat lumber in its final ready to use form. This eliminates any contaminated waste streams (saw dust, shavings and the like) which would otherwise occur during subsequent processing of lumber treated in crude form.

When treating lumber it is preferable to have the lumber already dry, that is, with its cells empty. This is because space is required for the incoming treating fluid.

Typically lumber is treated with either waterborne preservatives, or with solvent fluids based on non-polar organic solvents such as white spirits or Stoddard solvents (used in LOSP processes). Both processes are similar in that variations of vacuum and pressure are used.

A deficiency of known waterborne processes is that substantial uptakes are required to achieve full penetration. This in part is due to rewetting of the cell wall and to adsorption of water into or onto the cell wall. Thus to overcome this adsorption and ensure full penetration, uptakes can vary from 150 litres per cubic metre to 600 litres per cubic metre depending on the process used. Treatment with waterborne solutions causes swelling which is undesirable. Once treated, the lumber must be re-dried and this is costly. However waterborne processes do enable use of inexpensive well proven inorganic biocides.

A significant issue arises when using waterborne processes. Because the preservatives are necessarily soluble in water, they remain mobile for some time subsequent to treatment. That is they offer the potential for elution into the environment when in contact with ground water or when exposed to rain, with the potential hazard that might create. Modern processes can use a heating step wherein the interaction between the preservatives and the wood is hastened. This is time consuming, requires additional plant and a means of energy to raise the substrate temperature, and because the heat source is typically steam or hot water, waste streams contaminated with heavy metals result.

LOSP processes using non-polar organic solvents overcome the swelling problem and have quite low uptakes of around 30 to 40 litres per cubic metre. This is because there is no significant interaction between the solvent and the cell wall. That is, the solvent is non-polar and does not interact with or adsorb onto cellulose or lignin, which are polar. Uptakes can be as low as 30 to 50 litres per cubic metre. Drying in the normal sense is not required although the solvent must be allowed to evaporate. Whilst this process is effective for treating dry lumber, when using known methods eventually all the solvent escapes into the atmosphere thus becoming an environmental issue. Further, the solvent is manufactured from petroleum feedstocks thus is not a renewable resource and is subject to significant price variations.

According to traditional LOSP processes the solvent remains in the lumber after treatment. As LOSP solvents are expensive, using new solvent for every treatment is very costly. Further, the solvent contributes a serious environmental impact because the wood continues to release greenhouse gases and can adversely affect the health of persons living or working near the treated lumber. However, if the solvent was to be recovered and recycled for re-use, these issues could be minimised.

Many processes are known for the impregnation of lumber. These processes are adequately described in "industrial Timber Preservation", 1979, J G Wilkinson, Associated Business Press.

Several such processes include those of: 1) Rueping: Pre-pressure with gas followed by pressure with preservative or chemical solution; 2) Lowry: Pressure impregnation with preservative or chemical solution; and 3) Bethel: Vacuum followed by pressure impregnation with preservative or chemical solution.

to The Rueping process applies pre-pressure with gas prior to treatment with preservative fluids. This pre-pressure with gas fills the cells with a compressible medium such that after treatment with fluid the gas will expand forcing out any surplus fluid. However this can result in ongoing kickback of preservative contaminated fluid which may be hazardous and which kickback fluid may contain extractives which will interfere with preservative chemistry.

The Rueping and Lowry processes retain gas within the void spaces within the substrate. Thus, the impregnation process requires pumps to force fluid into the substrate against the back pressure of the gases in the voids.

The Bethel process removes all gases from the cells by application of a vacuum which cells then become completely filled with preservative fluid. When using aqueous fluid this method has the disadvantage that lumber is completely filled which can not be sucked out again. Accordingly, the lumber takes considerable time to dry.

LOSP preservatives use a solvent known as a Stoddard solvent, otherwise commonly known as aliphatic white spirits or mineral spirits. LOSP processes may also use chlorinated hydrocarbons or low molecular weight aliphatic hydrocarbons as a solvent. The modern versions of this are refined to remove aromatic compounds to improve odour and reduce toxicity however this reduces the solubility of many biocides in the solvent and thus may be counterproductive. Moreover, impregnation processes used to apply LOSP formulations have been developed and refined to limit the amount of solvent transferred to the wood whilst ensuring substantial penetration. An example of this would be the "Double-Vacuum" process, wherein the wood is evacuated and then flooded with preservative, the vacuum is released to atmospheric pressure for a short time, then the preservative is transferred away from the wood and a second vacuum is applied to remove excess preservative.

Despite these improvements, costs continue to escalate and because of environmental concerns there is a growing trend away from products using LOSP preservatives. However because re-drying of the substrate is not required there still exists a potential market, particularly if any residual solvent could be recovered and recycled.

Stoddard solvents are highly flammable and therefore appropriate plant design and operating procedures must be used to minimise potential adverse consequences. Alternative organic solvents are available but since these are either costly or toxic they are not favoured.

Because lumber has substantial voids within which the preservative can be transferred, whether for waterborne preservatives or LOSP preservatives, the lumber must be substantially dry. LOSP preservative processes dictate that the lumber must be dried to its final moisture content, that is, around twelve to fifteen per cent on a mass basis.

Lumber for waterborne processes can have greater moisture content, that is, above fibre saturation. Fibre saturation occurs at around thirty to forty per cent moisture content on a dry mass basis for softwoods. Thus whilst LOSP treated lumber is still "dry" after treatment and requires no re-drying in the traditional sense, it is usually still an expensive process because it wastes significant volumes of solvents (VOC's—volatile organic compounds). The waterborne process allows for higher pre-treatment moisture content but still suffers the expensive re-drying process.

Drying of wet lumber can be undertaken by a number of means including RF vacuum drying. This can be very rapid if using the likes of high temperature kiln drying but is slow using RF systems because of the energy limitations of RF equipment.

The expense and inefficiency of drying using RF vacuum processes from green wood, that is around 150 per cent moisture content on a dry mass basis, for softwoods is problematic.

When the lumber is nearly dry (i.e at or around fibre saturation, which is 30 to 40 per cent for softwoods), RF drying is more effective and can offer benefits. RF energy can be applied to organic substrates including lumber, and this RF energy impacts directly with, and below fibre saturation can be absorbed by, the bound water. Because RF energy can penetrate readily throughout the substrate, energy flow is rapid. However the absorption of RF energy depends on a material or compound within the substrate having the ability to absorb that energy.

Dielectric loss is electric energy that is converted into heat in a dielectric subjected to a varying electric field. It is also known as dielectric absorption. Polar compounds have a high dielectric loss. This is because they act as dipoles which interact with the varying electric field. Non-polar compounds, such as n-hexane or Stoddard solvent, have very little interaction with a varying electric field.

The dielectric loss of the material or compound within the substrate has a significant effect on the ability of the material or compound to absorb RF energy. Materials with low dielectric loss, such as the solvents used in traditional LOSP solvent system processes, will absorb little energy. Whereas a material with high dielectric loss, such as water and highly polar solvents including DMSO, N-methyl pyrrolidone and the like or glycols such as ethylene or propylene glycol or glycerol, glycol ethers, ketones, N-methylpyrrolidone, dimethyl sulphoxide, dimethylformamide will readily absorb the energy.

It is also important to consider the effects of RF energy on the substrate if that substrate is already substantially dry. For example if the lumber prior to treatment is at equilibrium moisture content, say between 12 and 15 per cent, RF heating will reduce the moisture content further. This could cause shrinkage, resin bleed, possibly checking, and if not controlled can cause degradation of appearance and strength. Resin bleed typically occurs if the temperature increases above 55 Celsius.

More recently practitioners have begun using aqueous emulsions of biocides to eliminate Stoddard solvents and the consequences they create. This can reduce costs. However, aqueous emulsions cause swelling of the wood and grain lifting. These degrade appearance and can necessitate re-drying. This can result in the additional cost of re-drying, which can also cause distortion of the wood.

A method that could eliminate the cost and environmental impact of using Stoddard solvents and yet not result in swelling might offer a valuable alternative.

OBJECT

It is an object of the present invention to provide a composition and/or a method of treatment of organic substrates, particularly lignocellulosic substrates, that overcomes at least one of the disadvantages of the prior art, or at least to provide the public with a useful choice.

STATEMENT OF INVENTION

In a first aspect the invention provides a method of improving the RF recovery of solvent from an organic substrate, the method including the step of treating a substrate with a composition including a dielectric loss enhancing additive.

In a second aspect the invention provides a method of RF recovery of an organic substrate treatment solvent having low dielectric loss, the method including the step of treating a substrate with a composition including an organic substrate treatment solvent having low dielectric loss and a dielectric loss enhancing additive.

Preferably the composition also includes at least one organic substrate treatment compound.

Preferably the organic substrate treatment solvent is a Stoddard solvent. Alternatively the organic substrate treatment solvent is a chlorinated hydrocarbon solvent. Alternatively the organic substrate treatment solvent is a low molecular weight aliphatic hydrocarbon solvent.

Alternatively the organic substrate treatment solvent is a combination of two or more solvents selected from the group consisting of Stoddard solvent, chlorinated hydrocarbon solvent and low molecular weight aliphatic hydrocarbon solvent.

Preferably the loss tangent of the dielectric loss enhancing additive is greater than 0.1 when exposed to RF energy using a frequency of 2.45 GHz.

Preferably the loss tangent of the organic substrate treatment solvent is less than 0.05 when exposed to RF energy using a frequency of 2.45 GHz.

Preferably the dielectric constant of the dielectric loss enhancing additive will be greater than the dielectric constant of the organic substrate treatment solvent.

Preferably the difference between the dielectric constant of the dielectric loss enhancing additive and the dielectric constant of the organic substrate treatment solvent will be 0.5 or more.

Preferably the dielectric constant of the dielectric loss enhancing additive will be 15 or greater.

Preferably the dielectric constant of the organic substrate treatment solvent will be less than 15.

Preferably the dielectric loss enhancing additive is or includes water.

Alternatively the dielectric loss enhancing additive is at least one organic solvent.

Preferably the dielectric loss enhancing additive is a mixture of at least two organic solvents.

Alternatively the dielectric loss additive is a mixture of water and at least one organic solvent.

Preferably the at least one organic solvent in the dielectric loss additive includes one or more organic solvent(s) of high polarity.

Preferably the organic solvent(s) is/are selected from one or more of the group consisting of alcohols, ketones, glycols, glycol ethers, glycol esters, phenols, amine oxides, quaternary ammonium compounds, amides, sulphoxides, lactones, lactams, polyhydroxy compounds, cyclic carbonates, or any other highly polar organic solvent.

More preferably the dielectric loss enhancing additive is N-methylpyrrolidone or dimethylsulphoxide.

In a third aspect, the present invention provides an organic substrate treatment composition including:
    at least one organic substrate treatment compound;
    an organic substrate treatment solvent having a low dielectric loss; and
    a dielectric loss enhancing additive.

Preferably the organic substrate treatment solvent having a low dielectric loss is a Stoddard solvent.

Alternatively the organic substrate treatment solvent having a low dielectric loss is a chlorinated hydrocarbon solvent.

Alternatively the organic substrate treatment solvent having a low dielectric loss is a low molecular weight aliphatic hydrocarbon solvent.

Alternatively the organic substrate treatment solvent having a low dielectric loss is a combination of two or more selected from the group consisting of Stoddard solvent, chlorinated hydrocarbon solvent and low molecular weight aliphatic hydrocarbon solvent.

Preferably, the organic substrate is lignocellulosic.

Preferably, the lignocellulosic substrate is lumber.

Preferably the loss tangent of the dielectric loss enhancing additive is greater than 0.1 when exposed to RF energy using a frequency of 2.45 GHz.

Preferably the loss tangent of the organic substrate treatment solvent having a low dielectric loss is less than 0.05 when exposed to RF energy using a frequency of 2.45 GHz.

Preferably the dielectric constant of the dielectric loss enhancing additive will be 0.5 or more greater than the dielectric constant of the organic substrate treatment solvent having a low dielectric loss.

Preferably the dielectric constant of the dielectric loss enhancing additive will be 15 or greater.

Preferably the dielectric loss enhancing additive is water.

Alternatively the dielectric loss enhancing additive is selected from at least one organic solvent.

Preferably the dielectric loss enhancing additive is a mixture of at least two organic solvents.

Alternatively the dielectric loss additive is a mixture of water and at least one organic solvent.

Preferably the organic solvent(s) include(s) one or more organic solvent(s) of high polarity.

Preferably the organic solvent(s) is/are selected from one or more of the group consisting of alcohols, ketones, glycols, glycol ethers, glycol esters, ethers, phenols, amine oxides, quaternary ammonium compounds, amides, sulphoxides, lactones, lactams, polyhydroxy compounds, cyclic carbonates, or any other highly polar organic solvent.

More preferably the dielectric loss additive is N-methylpyrrolidone or dimethylsulphoxide.

Preferably the dielectric loss enhancing additive is in the form of a single homogeneous phase.

Preferably the dielectric loss enhancing additive is in the form of a single homogeneous phase and includes an organic solvent which is miscible with Stoddard solvent and has a higher dielectric loss than Stoddard solvent.

Alternatively the dielectric loss enhancing additive includes a second heterogeneous phase.

Preferably the dielectric loss enhancing additive includes a second heterogeneous phase and the dielectric loss enhancing additive is in the form of an emulsion or micro-emulsion.

Preferably the dielectric loss enhancing additive has a second heterogeneous phase and the dielectric loss enhancing additive includes sub-micron particles or encapsulated sub-micron particles.

Preferably the dielectric loss enhancing additive includes a third heterogeneous phase.

Preferably the dielectric loss enhancing additive has a third heterogeneous phase and the dielectric loss enhancing additive includes sub-micron particles or encapsulated sub-micron particles.

Preferably the dielectric loss enhancing additive has at least one heterogeneous phase and the dielectric loss enhancing additive includes surfactants and/or dispersants.

Preferably the organic substrate treatment compound is a biocide.

Preferably the biocide is an organic or an inorganic biocide or a combination thereof.

Preferably the organic substrate treatment compound alters the physical properties of the substrate.

Preferably the organic substrate treatment compound is selected from resins or polymers or components which can become resins or polymers.

Preferably the organic substrate treatment compound is non-volatile.

Preferably organic substrate treatment composition further includes dyes, pigments, water repellents, fire retardants and the like.

Preferably the organic substrate treatment compound is an azole or mixture of azoles.

Preferably the organic substrate treatment compound is an azole or mixture of azoles and an amine copper complex.

Preferably the organic substrate treatment compound is an azole or mixture of azoles and a sub-micron copper compound.

Preferably the organic substrate treatment solvent having a low dielectric loss is in the form of a single homogenous phase.

Preferably the organic substrate treatment solvent having a low dielectric loss is in the form of a single homogeneous phase and the organic substrate treatment compound is soluble.

Alternatively the organic substrate treatment solvent having a low dielectric loss is in the form of a single homogeneous phase and the organic substrate treatment compound is dispersed in the homogeneous phase.

Alternatively the organic substrate treatment solvent having a low dielectric loss includes a second heterogeneous phase.

Preferably the organic substrate treatment solvent having a low dielectric loss includes a second heterogeneous phase and the substrate treatment compound or compounds can exist in either or both phases.

Preferably the organic substrate treatment solvent having a low dielectric loss includes a second heterogeneous phase and the organic substrate treatment compound(s) exist as a solution.

Alternatively the organic substrate treatment solvent having a low dielectric loss includes a second heterogeneous phase and the organic substrate treatment compound(s) exist as an emulsion.

Alternatively the organic substrate treatment solvent having a low dielectric loss includes a second heterogeneous phase and the organic substrate treatment compound(s) exist as a dispersion of sub-micron particles or sub-micron encapsulated particles.

Preferably the substrate is substantially dry lumber that is at or below fibre saturation.

Preferably the organic substrate treatment composition includes a fire retardant.

Preferably the fire retardant is in combination with a biocide.

The invention also relates to a process for treating an organic substrate wherein the composition as described in the third aspect of the invention above is applied to the substrate by dipping, deluging, spraying or vacuum pressure impregnation.

Preferably the composition is applied to the substrate and the solvent is recovered using RF energy.

Preferably the process includes the use of the treatment process described in WO 2004/054765, which process includes:
heating a target zone of the substrate;
applying the composition to the surface of the substrate wherein the temperature of the composition is lower than that of the target zone of the substrate;
recovery of the solvent using RF energy.

Preferably solvent recovery includes use of condensation.

Preferably solvent recovery includes use of vacuum condensation.

Preferably RF energy includes frequencies ranging from about 0.5 MHz to about 5 GHz.

Preferably the composition is applied to the substrate by dipping, deluging, spraying, or brushing. Additionally, variations of vacuum or positive pressure impregnation may be used.

Preferably the composition is applied at between ambient temperature and 100 Celsius.

Preferably the composition is applied to the substrate using vacuum pressure impregnation.

Preferably the composition is applied to the substrate using a single vacuum pressure impregnation.

Preferably if moisture is removed from the organic substrate, the amount of moisture removed during the recovery step is substantially the same as that moisture applied during the treatment.

Preferably recovery of evaporated solvent may be assisted by use of a vacuum to reduce solvent boiling point.

Preferably the composition is applied to the substrate which is at or below fibre saturation.

Alternatively the composition is applied to the substrate which is above fibre saturation.

Preferably the composition is applied to a substrate with a moisture content on a dry mass basis of less than about 80 percent.

Preferably the increase in temperature in the substrate as a result of the use of RF energy improves fixation of the biocides conveyed into the substrate by the composition.

Preferably any swell imparted to the substrate is at least minimised by the use of RF energy.

In another aspect of the invention, the invention provides an organic substrate treatment composition including a solvent selected from the group including Stoddard solvent, chlorinated hydrocarbon and low molecular weight hydrocarbons and a dielectric loss enhancing additive.

Preferably the dielectric loss enhancing additive is selected from one or more of alcohols, ketones, glycols, glycol ethers, glycol diethers, glycol esters, ethers, phenols, amine oxides, quaternary ammonium compounds, amides, sulphoxides, lactones, lactams, polyhydroxy compounds, cyclic carbonates or other highly polar organic solvent.

More preferably the dielectric loss additive is N-methylpyrrolidone or dimethylsulphoxide.

Preferably the dielectric loss enhancing additive is provided in combination with an organic substrate treatment compound.

Preferably the dielectric loss enhancing additive is or includes water.

Preferably the organic substrate treatment compound is a biocidal composition.

Preferably the organic substrate treatment compound is one which may impart properties of higher density or strength to at least a target zone of the substrate.

Preferably the organic substrate treatment compound is of a polymeric or pre-polymeric nature.

In another broad aspect, the invention provides an organic substrate to which a composition has been delivered in accordance with a method of the invention.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

DETAILED DESCRIPTION OF INVENTION

The following is a description of the preferred forms of the present invention given in general terms in relation to the application of the novel method. While the description focuses particularly on the delivery of compositions to lumber or logs, it should be appreciated that the method may be applicable to other organic substrates.

In general terms, the invention relates to compositions and methods of delivering compositions to an organic substrate, preferably a lignocellulosic substrate. The method allows for absorption or impregnation of the substrate by a treatment compound with a solvent and also for recovery, or improved recovery, of that solvent.

The method of the invention may be used to deliver any fluid composition to a substrate that comprises components with low dielectric loss and high dielectric loss. Polar compounds have a high dielectric loss. This is because they act as dipoles which interact with the varying electric field. Non-polar compounds have very little interaction with a varying electric field and therefore have a low dielectric loss.

Materials with low dielectric loss, such as the solvents used in traditional LOSP solvent system processes, will absorb little RF energy. Where this invention is particularly novel is that it allows the recovery of low dielectric loss solvents, such as Stoddard solvents, chlorinated hydrocarbons or low molecular weight aliphatic hydrocarbons, or combinations thereof, using the absorbance of RF energy resulting in rapid and efficient solvent removal. Low dielectric loss solvents do not generally absorb RF energy; hence efficient recovery of these solvents has not previously been achieved. However, the inventor has found that adding a dielectric loss enhancing additive to the composition including the low dielectric loss solvent allows the recovery, or improved recovery, of the low dielectric loss solvent using RF energy.

The composition will preferably include an organic substrate treatment compound. Persons of general skill in the art to which the invention relates will no doubt appreciate various compositions that may be applicable to the invention. However, by way of example, where treatment or prevention of infection or pre-infection by pest organisms is desired, compositions (biocide compositions) having pesticidal (fungicidal, bactericidal, insecticidal for example) or preservative properties may be used. Where it is desired that the substrate has increased density or strength properties, compositions containing certain polymeric or pre-polymeric components may be useful. Similarly, compositions may include amounts of use in waterproofing a substrate. Additionally, the compositions may contain certain dyes to colour the substrate may be used. Suitable biocides and polymeric/prepolymeric compounds would be known to the skilled person.

As used herein, "organic substrate" should be taken to mean any organic material which may be in need of delivery of a composition of some nature; for example for the purposes of protection or treatment to prevent or ameliorate growth of pest organisms. Such substrate is preferably lignocellulosic, for example living trees, wood products, lumber or logs. The invention may be applicable to substrates containing a level of moisture, or those which are substantially dry, at or below fibre saturation, or above fibre saturation but with a moisture content on a dry mass basis of less than approximately 80 percent.

Again, at least in the case of lignocellulosic substrates, those which are "substantially dry" include lumber dried by traditional methods. Such lumber may contain moisture of approximately 1 to approximately 30 per cent as a weight proportion of the lumber dry weight. It is preferred that the lumber for treatment according to the present invention is substantially dry. Lumber at or around fibre saturation, that is 30 to 40 per cent, could equally be treated with this composition. Substantially dry lignocellulosic substrates include lumber which has been processed via kiln drying, RF vacuum drying, air drying and the like and may have been milled to a final, or near final product, and may include for example a lumber composite material. Substrates above fibre saturation but with a moisture content on a dry mass basis of less than approximately 80 percent may also be treated according to the present invention but this option is less preferred. "Pests" or "pest organisms", as referred to herein, may include any organisms which may infect an organic substrate, such as wood. While the invention is particularly applicable to fungi, pest organisms may also include insects and the like.

When used herein, the terms "treatment" should be taken in its broadest possible context. It should not be taken to imply that a substrate is treated such that pest organisms are totally removed, although this is preferable. Prevention and amelioration of growth of pest organisms is also encompassed by the invention.

In one embodiment, the invention provides a method of improving the RF recovery of solvent from an organic substrate, the method including the step of treating a substrate with a composition including a dielectric loss enhancing additive.

This method is particularly useful in conjunction with LOSP processes. LOSP processes, LOSP processes use solvents with low dielectric loss to impregnate a substrate with an organic substrate treatment compound. These solvents with low dielectric loss are effective for treating dry lumber, but unless the solvent is recovered, the solvent escapes into the atmosphere thus becoming an environmental issue. Further, the LOSP process solvents (Stoddard solvents, chlorinated hydrocarbons or low molecular weight aliphatic hydrocarbons) are expensive and are manufactured from petroleum feedstocks thus are not a renewable resource and are subject to significant price variations. The present invention provides a method of recovering these solvents using RF energy, thereby minimising the impact of the solvent on the environment, the amount of the solvent used and accordingly, the expense of using the solvent.

The use of RF energy to recover solvents is a known technique. However, RF energy has traditionally not been used to recover solvents with a low dielectric loss as these solvents do not readily absorb the RF energy.

The inventor has found that the dielectric loss of the material or compound within the substrate has a significant effect on the ability of the material or compound to absorb RF energy. Materials with low dielectric loss, such as the solvents used in traditional LOSP solvent systems, will absorb little energy. Whereas a material with high dielectric loss, such as water and highly polar solvents including DMSO, N-methyl pyrrolidone and the like or glycols such as ethylene or propylene glycol or glycerol, will readily absorb the energy.

Further, the inventor has surprisingly and unexpectedly found that by using a dielectric loss enhancing additive in conjunction with a solvent with low dielectric loss, such as a Stoddard solvent or chlorinated hydrocarbon solvent or low molecular weight aliphatic hydrocarbon, the solvent with low dielectric loss will absorb RF energy and can therefore be recovered using RF energy.

Accordingly, in a further preferred embodiment the invention provides a composition to be applied to a surface of a substrate wherein the composition includes an organic substrate treatment solvent having a low dielectric loss, a dielectric loss enhancing additive and at least one organic substrate treatment compound. Preferably the organic substrate treatment solvent is a Stoddard solvent or chlorinated hydrocarbon solvent or low molecular weight aliphatic hydrocarbon, or a combination thereof.

The dielectric loss enhancing additive will preferably be highly polar, such as water or an organic solvent. The dielectric loss enhancing additive may also be a combination of more than one organic solvent or a combination of water and one or more organic solvents.

The dielectric loss of a solvent may be measured according to its loss tangent. Loss tangent varies depending on the frequency used when the solvent is exposed to RF energy. By way of example, Table 1 shows the loss tangent and dielectric loss of a selection of solvents when exposed to RF energy using a frequency of 2.45 GHz. Dielectric constants provide a measure of polarity. It is generally accepted that a solvent with a dielectric constant less than 15 is classified as non-polar. A solvent with a high dielectric constant will generally have a higher boiling point and higher absorbance of RF energy than a solvent with a low dielectric constant.

TABLE 1

| SOLVENT | LOSS TANGENT WHEN EXPOSED TO RF ENERGY USING A FREQUENCY OF 2.45 GHz | DIELECTRIC CONSTANT |
|---|---|---|
| Hexane (approximating Stoddard solvent) | 0.02 | 1.89 |

TABLE 1-continued

| SOLVENT | LOSS TANGENT WHEN EXPOSED TO RF ENERGY USING A FREQUENCY OF 2.45 GHz | DIELECTRIC CONSTANT |
|---|---|---|
| Water | 0.123 | 80.4 |
| Acetone | 0.054 | 20.7 |
| Dimethylsulphoxide | 0.825 | 46.7 |
| Dimethylformamide | 0.161 | 36.7 |
| Ethanol | 0.941 | 24.6 |
| Ethylene Glycol | 1.17 | 38.7 |
| Dichloromethane | 0.042 | 8.93 |
| N-methylpyrrolidone | 0.275 | 32.2 |
| p-Dichlorobenzene | 0.280 | 2.86 |

A dielectric loss enhancing additive according to the invention will have a high dielectric loss relative to the organic substrate treatment solvent. The dielectric loss enhancing additive as used in the present invention will preferably have a loss tangent of greater than 0.1 when exposed to RF energy using a frequency of 2.45 GHz to encourage efficiency of recovery of the organic substrate treatment solvent. The organic substrate treatment solvent will preferably have a loss tangent of less than 0.05 when exposed to RF energy using a frequency of 2.45 GHz.

According to the method of the present invention, the loss tangent of the organic substrate treatment solvent will be less than the loss tangent of the dielectric loss enhancing additive when exposed to RF energy using the same frequency. As exemplified in Table 1 where hexane has a loss tangent of 0.02 and dichloromethane has a loss tangent of 0.042, a difference in loss tangent as small as approximately 0.02 (when using the same frequency) will in some cases be sufficient.

In addition, a dielectric loss enhancing additive as used in the present invention will also preferably have a dielectric constant of 15 or greater.

Suitable organic solvents for inclusion in the dielectric loss enhancing additive include alcohols, ketones, glycols, glycol ethers, glycol esters, phenols, amine oxides, quaternary ammonium compounds, amides, sulphoxides, lactones, lactams, polyhydroxy compounds, cyclic carbonates or any other highly polar organic solvent having a relatively high dielectric loss compared to the primary solvent. In a particularly preferred embodiment the dielectric loss constant of the dielectric loss enhancing additive will be 0.5 greater than the dielectric loss constant of the organic substrate treatment solvent. In a particularly preferred embodiment, the dielectric loss enhancing additive will be N-methylpyrrolidone or dimethylsulphoxide.

It is preferable that the dielectric loss enhancing additive is soluble in, or miscible with, the organic substrate treatment solvent. Where the dielectric loss enhancing additive is not miscible with the organic substrate treatment solvent they may form an emulsion.

The dielectric loss enhancing additive may be in the form of a single homogeneous phase, or it may include a second and optionally third heterogeneous phase. Where the dielectric loss enhancing additive includes a heterogeneous phase, the dielectric loss enhancing additive may be in the form of an emulsion or micro-emulsion or it may include sub-micron particles or encapsulated sub-micron particles. Further, when the dielectric loss enhancing additive has a heterogeneous phase, preferably the dielectric loss enhancing additive will also include surfactants and/or dispersants.

The organic substrate treatment compound for treating the lumber may be a biocide, such as an organic or an inorganic biocide or a combination thereof, or may be selected from resins or polymers or components which can become resins or polymers. It is preferred that the organic substrate treatment compound is non-volatile so that it does not evaporate out of the substrate.

The organic substrate treatment compound should alter the physical properties of the substrate. For instance, the organic substrate treatment compound may impart properties of higher density or strength to at least the target zone of the substrate.

The organic substrate treatment compound may also be an azole or mixture of azoles, or a mixture of azoles and an amine copper complex, or mixture of azoles and a sub-micron copper compound. However, as one of skill in the art would know, any biocide or biocide combination soluble in the organic substrate treatment solvent or in the mixture of the organic substrate treatment solvent and the dielectric loss enhancing additive would be appropriate for use in accordance with the present invention.

The organic substrate treatment composition may also include dyes, pigments, water repellents, fire retardants and the like.

The organic substrate treatment solvent of the composition of the present invention may also be in the form of a single homogenous phase or it may include a second homogenous phase. When the solvent is in the form of a single homogeneous phase, it is preferable that the organic substrate treatment compound is soluble and therefore dissolves in the single homogenous phase. Alternatively, if the organic substrate treatment compound is not soluble, it may be dispersed in the homogeneous phase.

When the solvent includes a second heterogeneous phase, the substrate treatment compound or compounds can exist in either or both phases either as a solution, or an emulsion, or a dispersion of sub-micron particles or sub-micron encapsulated particles.

It will be appreciated that the solvent composition will depend on the physicochemical properties of the biocide(s) included or any other additive included. Depending upon other properties, the additive may require a co-solvent to enhance compatibility with other components. Such matters are within the skill and knowledge of the skilled person once armed with the knowledge of the present invention.

The composition may be applied to a surface of the substrate using any known means of bringing a composition into contact with a material. By way of example, the composition is applied by dipping, deluging, spraying, or brushing. While the inventor does not believe it necessary to apply active pressure to effect delivery of a composition in accordance with the invention, there may be instances where active pressure systems (positive pressure or vacuum) may be used to assist with delivery. A process of application which includes heating a target zone of the substrate and then applying the composition to the surface of the substrate when the temperature of the composition is lower than that of the target zone of the substrate may also be appropriate. Reference is made to the delivery system described in WO 2004/054765 in this regard.

While the operating temperature of the composition may vary depending on the nature of the substrate treatment compound (e.g. biocide), for example its solubility and the like, the composition is preferably at or around ambient temperature. Temperatures of up to 100° C. could be used depending on the components of the composition. Higher temperatures are less preferred due to the potential to lose solvent and possibly treatment compound from the composition before application.

Once the substrate has been sufficiently impregnated with the treatment composition including an organic substrate treatment compound, an organic substrate treatment solvent having a low dielectric loss and a dielectric loss enhancing additive, the organic substrate treatment solvent (e.g. Stoddard solvent) is encouraged to evaporate using RF energy and the emitted solvent using condensation. Any water applied to the substrate during treatment in addition to the water in the applied treatment composition is also encouraged to evaporate using RF energy.

It is preferred that where moisture is removed from the organic substrate, the amount of moisture removed during the recovery step is substantially the same as that applied during the treatment.

The frequency of the RF energy used to recover the low dielectric loss solvent preferably ranges from about 0.5 MHz to about 5 GHz. This encourages the low dielectric loss solvent to evaporate and the emitted solvent is recovered by condensation. The recovery of evaporated solvent may be assisted by the use of a vacuum condensation to reduce the solvent boiling point.

The application of RF energy will cause an increase in temperature in the substrate, which advantageously improves the fixation of the biocides conveyed into the substrate by the composition.

EXAMPLES

The invention will now be further described with reference to the following non-limiting examples.

Using the principles described in the invention, the inventor set out to study whether the invention was applicable to preparation of stable compositions of biocides wherein a low dielectric loss solvent and a dielectric loss enhancing additive are used in combination.

Example 1 (Comparative Example)

A 20 gram sample of white spirits (Stoddard solvent) was heated using RF energy at 2.45 GHz and 900 watts for 60 seconds. Included in the chamber was 50 grams of water as a dummy load so reflection of unabsorbed energy did not destroy the magnetron. The temperature of the solvent at start was 22 Celsius and did not change during heating. This shows that Stoddard solvent is a poor absorber of RF energy.

Example 2

A similar sample as in Example 1 but with 2 grams N-methylpyrrolidone added was heated under the same conditions. A homogeneous solution was formed. After heating the sample had a temperature of 55 Celsius. This confirms that addition of N-methylpyrrolidone as a dielectric loss enhancing additive increases the absorption of RF energy by the Stoddard solvent.

Example 3

To a similar sample as in Example 1 was added 2 grams of ethylene glycol monobutyl ether. The fluid was not clear but otherwise appeared uniform. After heating the temperature increased to 45 Celsius. This confirms that addition of ethylene glycol monobutyl ether as a dielectric loss enhancing additive increases the absorption of RF energy by the Stoddard solvent.

Example 4

To a similar sample as in Example 1 was added 2 grams of alkyl dimethyl amine N-oxide. This did not form a homogeneous fluid. However after heating the temperature increased to 43 Celsius. This confirms that addition of alkyl dimethyl amine N-oxide as a dielectric loss enhancing additive increases the absorption of RF energy by the Stoddard solvent.

Example 5

To a similar sample as in Example 1 was added 2 grams of dimethylsulphoxide. This formed a homogeneous fluid. After heating the temperature increased to 61 Celsius. This confirms that addition of dimethylsulphoxide as a dielectric loss enhancing additive significantly increases the absorption of RF energy by the Stoddard solvent.

Thus it can be seen that homogeneous solutions including Stoddard solvent and a dielectric loss enhancing additive can be prepared. Further, temperatures of around 50 Celsius are readily achieved in a short time frame. Using a vacuum this facilitates ready removal of the solvent in a short time frame at such temperatures.

In order to determine if the enhanced heat transfer into the solvent containing the dielectric loss enhancing additive resulted in greater recovery of solvent from wood, a number of experiments were undertaken. Typically these used non polar solvents such as Stoddard solvent and/or dichloromethane as the primary solvent and dielectric loss enhancing additive such as N-methylpyrrolidone or dimethylsulphoxide.

Whilst a range of RF frequencies can be used, for simplicity small wood samples were prepared and treated and microwaves were used as the RF source.

Because of limitations in applying RF energy to laboratory samples the following examples were given a single dose of energy rather than continuous. The results clearly demonstrate better recovery when a dielectric loss enhancing additive is used in accordance with the invention (such as Example 7) compared to where a dielectric loss enhancing additive is not added (Examples 6). If continuous energy had been applied recovery would have been substantially greater.

Example 6 (Comparative Example)

Samples of wood were treated to a retention of 200 and 198 litres per cubic metre with pure Stoddard solvent. These samples were then irradiated for 15 seconds at 900 watts of RF energy. The samples were then subject to vacuum recovery for 5 minutes. The amount of solvent recovered was 16.7 and 17.5 per cent respectively.

Example 7

The above example was repeated using Stoddard solvent modified by the addition of 10%

N-methylpyrrolidone. Recovery increased to 24.6 and 25.2% respectively. Bearing in mind that the N-methylpyrrolidone is not being recovered in this experiment, the actual Stoddard solvent recovery is therefore around 49.2 and 50.4% respectively.

Example 8 (Comparative Example)

A more benign recovery regime was used in the following examples because dichloromethane has a lower boiling point and the experiment was designed to show differences not absolute values. The regime used a vacuum reduced by 50 per cent and the time at vacuum was 1 minute instead of 5 minutes.

Similar wood samples were treated with pure dichloromethane. The recovery after radiation and vacuum was 66.2 and 61.1 per cent respectively.

Example 9

Similar samples were treated with dichloromethane supplemented with 10 per cent dimethylsulphoxide. The recovery increased to 73.6 per cent. Corrected for the amount of additive remaining in the wood the recovery of solvent is close to 80 per cent.

Example 10

Similar samples were treated with dichloromethane supplemented with 10 per cent N-methylpyrrolidone. The recovery increased to 80 per cent. Corrected for the amount of additive remaining in the wood the recovery of solvent is greater than 90 per cent.

It is important to remove these non-polar solvents from wood because they are toxic and in some cases flammable. These experiments confirm addition of an RF energy absorbing additive (dielectric loss enhancing additive) can assist with solvent removal and recovery.

An additional benefit is that addition of the likes of N-methylpyrrolidone, dimethylformamide or Dimethylsuphoxide as a dielectric loss enhancing additive considerably enhances the solubility of biocides in the solvent system.

Those versed in the art will recognise the benefit of the solvent system of this invention. If one were to apply RF energy to lumber treated with a Stoddard solvent, energy will be absorbed preferentially by bound water in the wood, because Stoddard solvent has a low dielectric loss. This energy will in part transfer from the water to the Stoddard solvent but because the latter has a high boiling point, water will preferentially be removed from the lumber. The wood may therefore be over dried and this can cause shrinkage, checking, resin bleed and can cause degradation in appearance. Further, the transfer of energy may be slower than the evaporation of water and therefore the process must be carried out slowly so solvent can be removed.

Because the solvent system of this invention includes a dielectric loss enhancing additive, the final moisture content of the treated lumber can be kept in balance. While it would be expected that swelling would occur, the inventor has surprisingly and unexpectedly found that lumber treated with this solvent system, and from which solvent is recovered, has dimensions substantially the same to that lumber prior to treatment.

Thus application of this invention can provide lumber originally at or above fibre saturation that is treated and dried in a single process.

The benefits of this process are that treatment can be achieved with traditional LOSP type preservatives using the same solvent system, but the solvent can be economically recovered for re-use. This entire process can be undertaken in the same treatment vessel thus reducing additional handling costs.

Thus it can be seen that the inventor has discovered solvent combinations which achieve economical and complete treatment of substrates and yet enables the user to use solvents that are usually difficult to recover. During this process additional drying and/or fixation of the chemical within the substrate can be achieved. The key benefits over either waterborne systems or fully non-polar systems, is a reduction in cost without the concerns for significant rewetting of the substrate; thus the user is not disadvantaged in his choice.

Although the invention has been described by way of example with reference to a preferred embodiment, modifications and variations may be made to the invention without departing from the scope or spirit of the invention as claimed.

I claim:

1. A method of improving the RF recovery of organic substrate treatment solvent from an organic substrate, the method including the steps of:
   (i) treating the organic substrate with a composition including an organic substrate treatment compound, an organic substrate treatment solvent, and a dielectric loss enhancing additive; and
   (ii) recovering the solvent using RF energy,
   wherein the dielectric constant of the dielectric loss enhancing additive is greater than the dielectric constant of the organic substrate treatment solvent, and the dielectric loss enhancing additive comprises a first homogeneous phase and a second heterogeneous phase.

2. The method of claim 1 wherein the organic substrate treatment solvent is selected from any one or more of: a Stoddard solvent, a chlorinated hydrocarbon solvent, a low molecular weight aliphatic hydrocarbon solvent.

3. The method of claim 1 wherein the loss tangent of the dielectric loss enhancing additive is greater than 0.1 when exposed to RF energy using a frequency of 2.45 GHz.

4. The method of claim 1 wherein the loss tangent of the organic substrate treatment solvent is less than 0.05 when exposed to RF energy using a frequency of 2.45 GHz.

5. The method of claim 1 wherein the difference between the dielectric constant of the dielectric loss enhancing additive and the dielectric constant of the organic substrate treatment solvent is 0.5 or more.

6. The method of claim 1 wherein the dielectric constant of the dielectric loss enhancing additive is 15 or greater.

7. The method of claim 1 wherein the dielectric constant of the organic substrate treatment solvent is less than 15.

8. The method of claim 1 wherein the dielectric loss enhancing additive is or includes water.

9. The method of claim 1 wherein the dielectric loss enhancing additive is or includes at least one organic solvent.

10. An organic substrate treatment composition including:
    at least one organic substrate treatment compound;
    an organic substrate treatment solvent having a low dielectric loss; and
    a dielectric loss enhancing additive
    wherein the dielectric constant of the dielectric loss enhancing additive is greater than the dielectric constant of the organic substrate treatment solvent, and the dielectric loss enhancing additive comprises a first homogeneous phase and a second heterogeneous phase.

11. The organic substrate treatment composition of claim 10 wherein the dielectric loss enhancing additive is in the form of a single homogeneous phase.

12. The organic substrate treatment composition of claim 10 wherein the dielectric loss enhancing additive has at least one heterogeneous phase and the dielectric loss enhancing additive includes surfactants and/or dispersants.

13. The organic substrate treatment composition of claim 10 wherein the organic substrate treatment solvent having a low dielectric loss is in the form of a single homogenous phase.

14. The organic substrate treatment composition of claim 10 wherein the organic substrate treatment solvent having a low dielectric loss includes a second heterogeneous phase.

15. A process for treating an organic substrate wherein the composition of claim 10 is applied to the substrate by dipping, deluging, spraying, brushing or vacuum pressure impregnation.

16. The process of claim 15 wherein the composition is applied to the substrate and the solvent is recovered using RF energy.

17. The process of claim 15 wherein the composition is applied at between ambient temperature and 100 Celsius.

18. The process of claim 15 wherein the composition is applied to the substrate using vacuum pressure impregnation.

19. The process of claim 15 wherein if moisture is removed from the organic substrate, the amount of moisture removed during the recovery step is substantially the same as that moisture applied during the treatment.

\* \* \* \* \*